March 2, 1948.  W. C. SILVA  2,436,831
CELERY HARVESTER
Filed May 15, 1944  2 Sheets-Sheet 1

Inventor
W. C. Silva
By Mason Fenwick & Lawrence
Attorneys

March 2, 1948.  W. C. SILVA  2,436,831
CELERY HARVESTER
Filed May 15, 1944  2 Sheets-Sheet 2

Inventor
W. C. Silva
By Mason Fenwick & Lawrence
Attorneys

Patented Mar. 2, 1948

2,436,831

UNITED STATES PATENT OFFICE 2,436,831

CELERY HARVESTER

Willard C. Silva, Sarasota, Fla.

Application May 15, 1944, Serial No. 535,729

14 Claims. (Cl. 55—108)

This invention relates to a celery harvester.

The shipping package almost universally employed for celery is a crate about sixteen and a half inches deep. Since commercial types of celery grow considerably taller than this, it is therefore necessary to cut off the top as well as the root, to reduce the celery stalk to the proper dimension for packaging. The habit of growth of the celery plant is such that when mature, there are a number of dead and worthless stems extending laterally from the lower part of the stalk which must be trimmed off before the celery stalk is in condition to be crated for shipment.

Customarily, the standing stalk is severed from the roots just below the surface of the ground, either manually or by cutting apparatus which is drawn along the row, the severed stalks falling to the ground. Then these are picked up and the lower stems and foliage stripped off manually by a worker who follows the cutter. Then the stalks are hauled to a packing shed where the tops are lopped off by a worker wielding a machete.

In this crude method of harvesting there is an undue multiplication of labor, also considerably wastage of good celery in the debris which litters the field, and further wastage due to inaccuracy in topping.

The principal object of the present invention is to reduce the amount of labor required for harvesting and packaging celery, to avoid unnecessary handling, to minimize wastage and to accelerate the harvesting operation generally, by providing a harvesting machine which will in a single operation when moved along the row, cut off the roots, top the foliage at the proper height, trim off the worthless side stems and foliage, and discharge the finished stalks upon the ground so that no manual operation remains except to transport the celery to the packing house and pack it into the crate.

Other objects of the invention will appear as the following description of a preferred and practical embodiment thereof proceeds.

In the drawings throughout the several figures of which the same reference characters have been used to denote identical parts:

Figure 1:
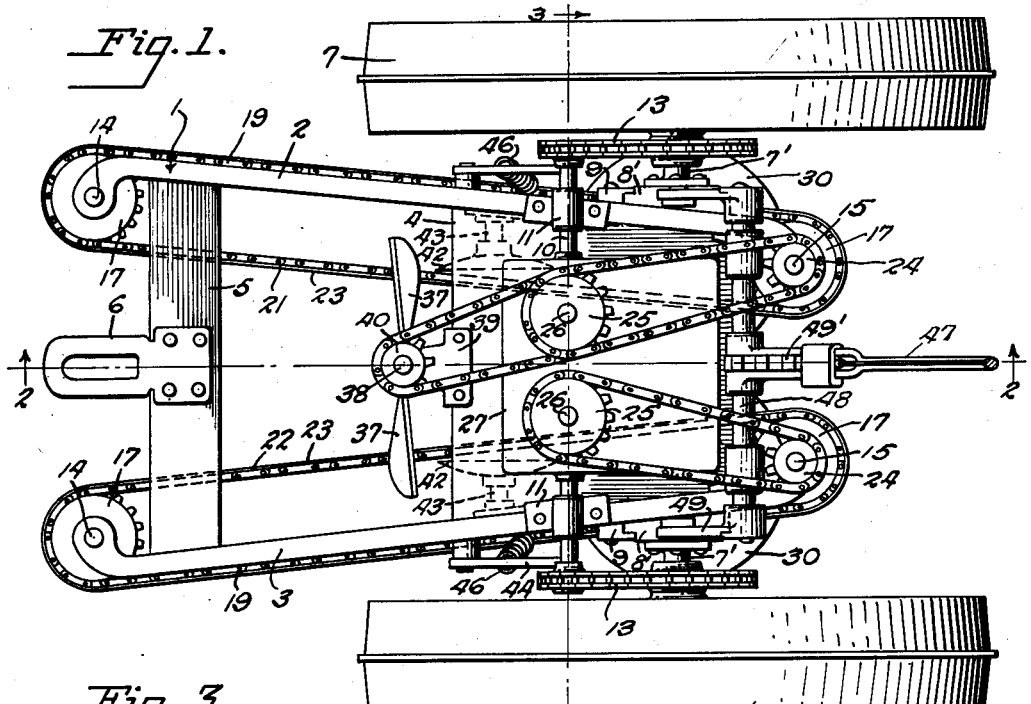
Figure 1 is a plan view, partly in section, of a harvesting machine embodying the principles of the invention.
Figure 3:
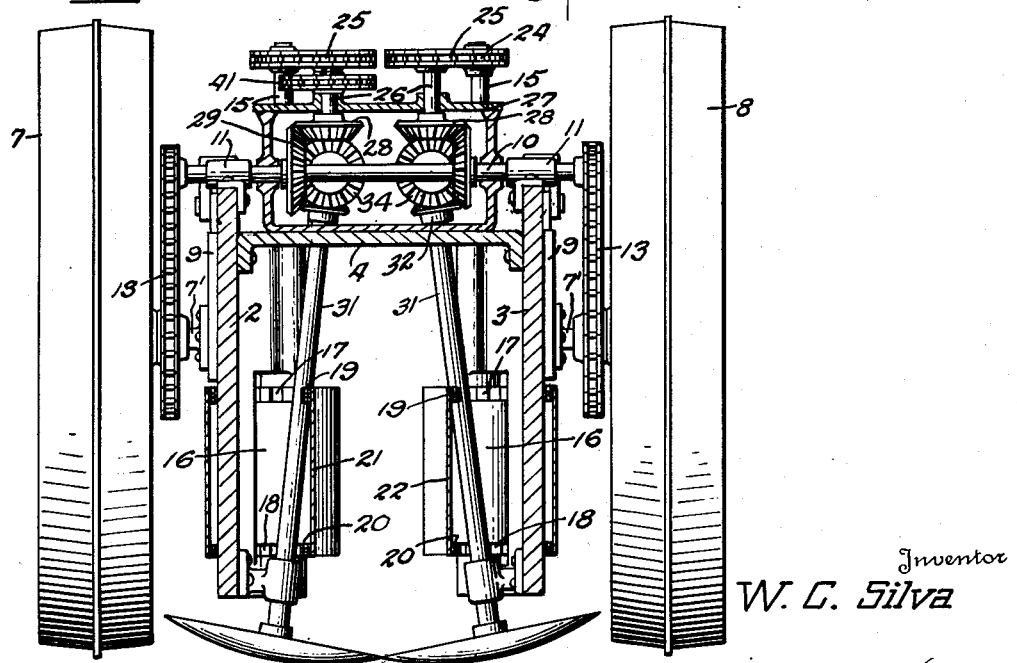
Figure 3 is a vertical cross-section taken along the line 3—3 of Figure 1, certain parts being shown in elevation.
Figure 2:
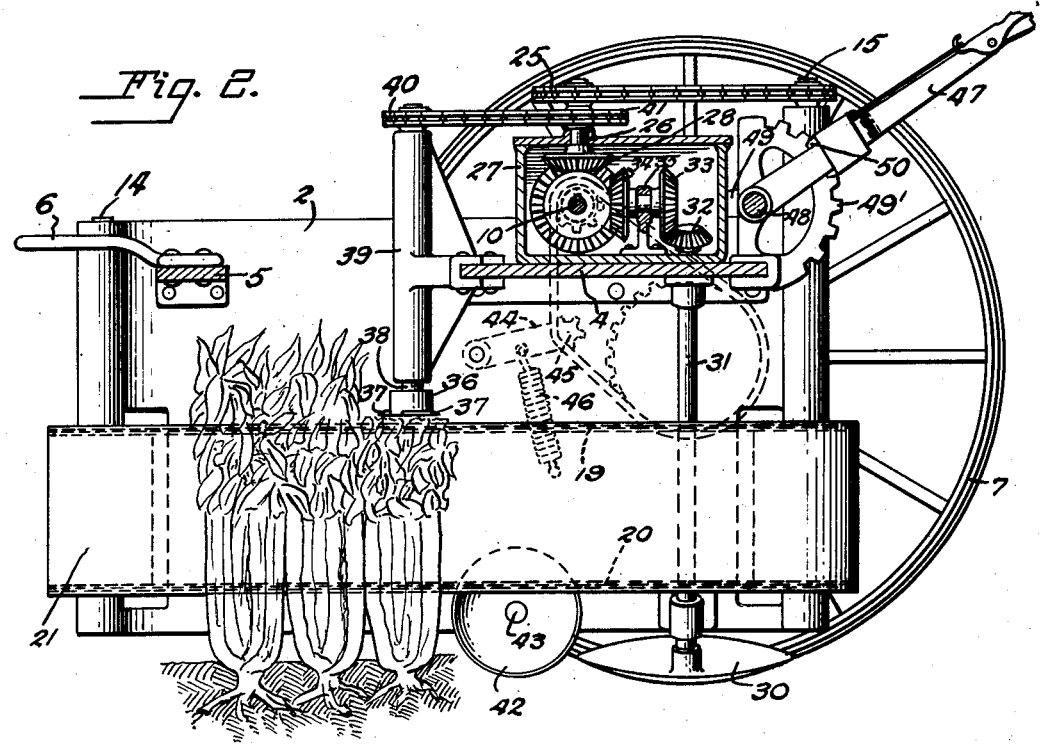
Figure 2 is a vertical longitudinal section taken substantially along the line 2—2 of Figure 1.

Referring now in detail to the several figures, there is a frame designated as a whole by the reference character 1, consisting of two spaced vertical side members 2 and 3 convergent toward the rearward end of the harvester. The side members are connected at their rearward portions by a horizontal platform 4, at such a height above the ground as to permit the topped celery to pass therebeneath. The forward portions of the side members 2 and 3 are connected by a horizontal brace 5, also at such a height as to pass above the celery. A tractor hitch 6 may be secured to the brace 5.

The frame thus constituted is supported above the ground at the front end by the tractor hitch 6, and near its rear end by the traction wheels 7 and 8. Said traction wheels are journaled on stub shafts 7' carried by blocks 8' (see Figures 1 and 4) which are vertically slidable between guides 9 secured to the outer sides of the respective side members.

The traction wheels, in the embodiment of the invention illustrated, serve as the driving means for the several driven instrumentalities embodied in the harvester, the driving power being distributed from a lay shaft 10, mounted transversely of the frame 1 and journaled in bearings 11, mounted on top of the members 2 and 3. The stub shafts 7' are provided with sprockets 11 and the ends of the lay shaft 10 with sprockets 12, which sprockets are connected by chains 13.

The opposite ends of the frame members 2 and 3 are provided with vertically aligned bearings, in which are journaled the vertical forward shafts 14 and the vertical rear shafts 15. At a suitable distance above the ground, which for example may be six inches, said forward and rearward shafts are provided with the belt drums 16. Said drums may, for example, be ten inches high, and as shown, are provided at their upper and lower ends with sprockets 17 and 18, each set of upper sprockets being connected by a chain 19, and each set of lower sprockets by a chain 20. The space between the upper and lower chains is bridged by the continuous belts 21 and 22, which belts encompass the respective side members. The distance between the belts in the transverse plane of the forward shafts 14 may be thirteen inches, and in the transverse plane of the rear shafts 15, seven inches.

The belts are driven so as to revolve in opposite directions with the inner flights 23, traveling contra to the direction of movement of the harvester along the row, and preferably at the same linear speed as the forward speed of the harvester, so that the standing celery entering at the wide end of the passage formed between the inner flights 23 and of which said flights form the side walls is retained in upright position throughout its relative movement through said passage, and after severance from the roots, is positively discharged from the rear of said passage by the action of said belts.

The driving connections to the belts is as follows. Each of the rear shafts 15 has a sprocket 24 at its upper end, chain connected to a corresponding sprocket 25 at the upper end of a stub shaft 26 journaled in the top of a gear box 27. The lower end of each stub shaft 26 has a bevel gear 28 meshing with a bevel gear 29 on the lay shaft 10.

It will be understood that wherever gears, sprockets and chains are specifically referred to throughout the specification, these are by way of example and not to be construed as excluding other driving instrumentalities from the scope of the invention.

The root cutters, as shown, comprise dished coulters 30, preferably inclined, so that only a small arcuate portion of said coulters works beneath the surface of the ground. The cutting edges of said coulters come into a position of tangency in the median longitudinal vertical plane of the harvester. Said coulters are mounted upon inclined shafts 31, journaled in bearings adjacent the bottoms of the side members 2 and 3 and in apertures through the platform 4 and the bottom of the gear box 27. The upper ends of the shafts 31 within said gear box are provided with bevel gears 32 meshing with a bevel gear 33 unitary with a bevel gear 34, which in turn meshes with the corresponding gear 29 on the lay shaft 10. The gear unit consisting of the gears 33 and 34 is journaled in a bearing 35, mounted in the gear box.

The shafts 31 of the root cutting coulters 30 are preferably arranged in the same vertical transverse plane as the axis of rotation of the traction wheels 7 and 8, so that the depth of cut of said coulters can be adjusted without disturbing the forward angle of attack of said coulters with respect to the celery roots and the adjacent soil.

The topping cutter, as shown, comprises a rotatable hub 36 carrying the diametrically opposed knife blades 37. Said cutter is mounted on a vertical shaft 38 journaled in a bearing 39 mounted on the forward edge of the platform 4. The upper end of said shaft carries a sprocket 40, chain connected to a sprocket 41, mounted on one of the stub shafts 26. The gear ratio of the topping cutter drive is such that said cutter rotates at a fairly high velocity, in order to make a clean cut through the lighter parts of the celery stalks and foliage. The topping cutter is arranged at such level above the root cutter as to produce the desired overall length of the finished stalk.

The harvester is provided with a pair of spaced side coulters 42, rotatable in planes parallel to the longitudinal median vertical plane of the harvester. Said side coulters are journaled on inwardly projecting studs 43, mounted on the inner sides of the side members 2 and 3. They are not positively driven, but are of such diameter that their lower edges penetrate the soil to some slight distance, so that they are rotated by friction with the soil as the harvester moves along the row. The upper edges of the side coulters preferably extend some little distance within the orbits of the respective belts.

The longitudinal displacement of the topping cutter, side coulters and root cutting coulters is such that the celery is first topped while standing in the row, then the side coulters trim the worthless lateral stems, and finally, the root coulters sever the topped and trimmed stalks which are then discharged from the rear of the harvester.

In operation, the celery enters the passage between the inner flights 23 of the belts at the wide end, the belts engaging the foliage and stems from about six inches from the ground to sixteen inches from the ground, progressively compacting the stems and foliage as the celery moves toward the narrower end of said passage. During this movement, the celery is kept upright by the belts which travel rearwardly at the same speed that the harvester travels forwardly. The belts, therefore, exert no conveyor action upon the celery until it has been detached from the roots by the root cutters. Thereafter, the belts serve as conveyors to discharge the finished celery stalks from the narrower rear end of the passage between the belts.

Since the entire frame 1 is adjusted for depth, the topped cutter preserves its same vertical distance from the root cutters through the entire range of depth adjustment, and since the range of depth adjustment is never more than an inch or so, the side coulters 42 retain their frictional engagement with the soil.

Figure 4:
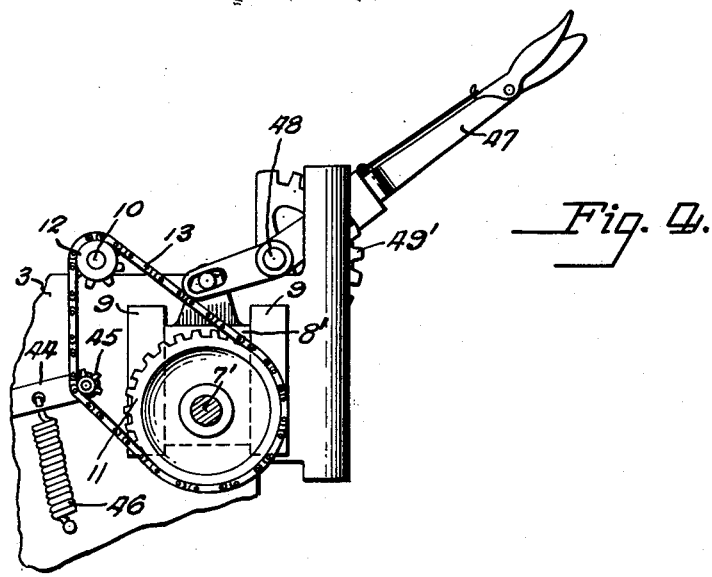
Figure 4 is a fragmentary view in side elevation, showing means for regulating the depth of cut of the root cutters and correspondingly adjusting the positions of the correlated side and topping cutters.

Inasmuch as the adjustment for depth involves variation in the distance between the axis of the stub shafts 7 and the axis of the lay shaft 10, means is provided for taking up the slack in the chain 13 which forms the driving connection between the traction wheels and lay shaft. This means is shown in Figure 4 to consist of a pivoted arm 44 carrying an idler sprocket 45 at its free end, which is continuously pressed against the chain 13 by means of a spring 46. Depth adjustment is effected by means of a hand lever 47 at the middle of a rock shaft 48 journaled on the frame 1, said rock shaft having crank arms 49 at its ends, making a pin and slot connection with the vertically slidable blocks 8' upon which the traction wheels are mounted. A rack 49' engaged by a detent pawl 50 maintains the depth adjustment.

While I have in the above description disclosed what I believe to be a preferred and practical embodiment of the invention, it will be understood to those skilled in the art that the specific details of construction and arrangement of parts are by way of illustration and not to be construed as limiting the scope of the invention defined in the appended claims.

What I claim as my invention is:

1. Celery harvester comprising a frame, means carried thereby providing rearwardly moving, rearwardly convergent, spaced side walls defining a passage open at the bottom and ends for the longitudinal travel therethrough of standing celery, said walls being spaced from the ground and of such height as to engage the bushy part of the celery in an intermediate zone above the root and below the top whereby the bushy part is progressively compacted as it travels from the wide to the narrow end of said passage, root cutting means carried by said frame working at a level beneath said passage, top cutting means working at a level adjacent the top of said passage, positioned at a point in the length of said passage where the celery is partially compacted, said top cutting means being positioned in advance of said root cutting means whereby the top is severed while the celery is standing.

2. Celery harvester comprising a frame, traction wheels supporting said frame, belts carried by said frame arranged so that their inner flights provide rearwardly moving, rearwardly convergent, spaced side walls defining a passage open at the bottom and ends for the longitudinal travel therethrough of standing celery, said belts being spaced from the ground and being of such height as to engage the bushy part of the celery in an intermediate zone above the root and below the top whereby the bushy part is progressively compacted as it travels from the wide to the narrow end of said passage, root cutting means carried by said frame working at a level beneath said passage, top cutting means working at a level adjacent the plane of the tops of said belts, positioned at a point in the length of said passage where the celery is partially compacted, said top cutting means being positioned in advance of said root cutting means whereby the top is severed while the celery is standing, and means for driving said belts, root cutting means and top cutting means from at least one of said traction wheels.

3. Celery harvester comprising a frame, a pair of coaxial traction wheels supporting said frame, belts carried by said frame arranged so that their inner flights provide rearwardly moving, rearwardly convergent, spaced side walls defining a passage open at the bottom and ends for the longitudinal travel therethrough of standing celery, said belts being spaced from the ground and of such height as to engage the bushy part of the celery in an intermediate zone between the root and top whereby the bushy part is progressively compacted as it travels from the wide to the narrow end of said passage, root cutting means carried by said frame working at a level beneath said passage, top cutting means carried by said frame working at a level adjacent the plane of the tops of the said belts, said top cutting means being positioned in advance of said root cutting means whereby the top is severed while the celery is standing, means for driving said belts, root cutting means and top cutting means, means for adjusting said frame depthwise with respect to said traction wheels, said root cutting means being positioned to work substantially in the vertical transverse plane of the axis of said traction wheels.

4. Celery harvester comprising a frame, a pair of coaxial traction wheels supporting said frame, belts carried by said frame arranged so that their inner flights provide rearwardly moving, rearwardly convergent, spaced side walls defining a passage open at the bottom and ends for the longitudinal travel therethrough of standing celery, said belts being spaced from the ground and of such height as to engage the bushy part of the celery in an intermediate zone between the root and top whereby the bushy part is progressively compacted as it travels from the wide to the narrow end of said passage, root cutting means carried by said frame working at a level beneath said passage, top cutting means carried by said frame working at a level adjacent the plane of the tops of said belts, said top cutting means being positioned in advance of said root cutting means whereby the top is severed while the celery is standing, means for driving said belts, root cutting means and top cutting means from said traction wheels, means for adjusting said frame depthwise with respect to said traction wheels, said root cutting means being positioned to work substantially in the vertical transverse plane of the axis of said traction wheels.

5. Celery harvester comprising a frame, laterally spaced driven belt-like members carried thereby having their adjacent flights arranged to form rearwardly convergent, rearwardly moving side walls defining a passage open at the bottom and ends, adapted to operate astride a row of standing celery as said frame is drawn forwardly, said side walls being spaced from the ground and of such height as to engage the bushy part of the celery in an intermediate zone extending heightwise from a point adjacent the ground to a point below the top, root cutting and top cutting means carried by said frame, the former working at a level below said passage, the latter working at a level adjacent the plane of the tops of said flights, said top cutting means being positioned in advance of said root cutting means whereby the top is severed while the celery is standing, said root and top cutting means being reciprocably adjustable as a unit in a depthwise direction for varying the depth of said root cutting means relative to the surface of the ground while maintaining a fixed distance in depthwise direction between said root and top cutting means.

6. Celery harvester comprising a frame, laterally spaced driven belt-like members carried thereby having their adjacent flights arranged to form rearwardly convergent rearwardly moving side walls defining a passage open at the bottom and ends, said side walls being spaced from the ground and of such height as to engage the bushy part of celery up to a point below the top of the celery, said harvester being adapted to operate astride a row of celery to admit the bushy part at the forward end of said passage and to progressively compact said bushy part as said frame is drawn forwardly, top cutting means adjacent the top of said passage located at a point in the length of said passage where the celery is partially compacted, for severing the top, root cutting means located rearwardly of said top cutting means, positioned to operate at a level beneath said passage, a power shaft on said frame, and driving connections on said frame from said power shaft to said top cutting and root cutting means for operating said means.

7. Celery harvester comprising a frame, laterally spaced driven belt-like members carried thereby having their adjacent flights arranged to form rearwardly convergent rearwardly moving side walls defining a passage open at the bottom and ends, said side walls being spaced from the ground and of such height as to engage the bushy part of celery up to a point below the top of the celery, said harvester being adapted to operate astride a row of celery to admit the bushy part at the forward end of said passage and to progressively compact said bushy part as said frame is drawn forwardly, top cutting means adjacent the top of said passage located at a point in the length of said passage, where the celery is partially compacted, for severing the top, root cutting means located rearwardly of said top cutting means, but forward of the rear end of said passage, positioned to operate at a level beneath said passage, a power shaft on said frame, and driving connections on said frame from said power shaft to said top cutting and root cutting means for operating said means.

8. Celery harvester comprising a frame, ground engaging means, means supporting said frame reciprocably in depth direction from said ground engaging means, longitudinally extending laterally spaced rearwardly convergent side walls carried by said frame defining a passage open at the bottom and at both ends for the travel of standing celery as said harvester is moved over a row of celery, for progressively compacting the foliage portion of the celery, root cutting means carried by said frame beneath said passage, top cutting means carried by said frame at a level above said root cutting means and at an intermediate point in the length of said passage whereby the celery is partially compacted at the point at which the top is cut, and means carried by said frame for adjustably moving said frame relative to said ground engaging means thereby moving said root cutting means and top cutting means as a unit in a direction toward or from the ground.

9. Celery harvester comprising a frame, ground engaging means, means supporting said frame reciprocably in a depth direction from said ground engaging means, laterally spaced driven belt-like members carried by said frame having their adjacent flights arranged to form rearwardly convergent rearwardly moving side walls defining a passage open at the bottom and ends, said side walls being spaced from the ground and of such height as to engage the bushy part of celery up to a point below the top of the celery, said harvester being adapted to operate astride a row of celery to admit the bushy part at the forward end of said passage and to progressively compact said bushy part as said harvester is drawn forwardly, top cutting means carried by said frame adjacent the top of said passage located at a point in the length of said passage where the celery is partially compacted, for severing the top, root cutting means carried by said frame located rearwardly of said top cutting means, positioned to operate at a level beneath said passage, a power shaft on said frame, driving connections on said frame from said power shaft to said side wall means, said root cutting means and top cutting means for operating said means, and means for adjusting said frame depthwise with respect to said ground engaging means whereby said top cutting means and root cutting means move as a unit in depthwise direction for varying the depth of said root cutting means relative to the surface of the ground, while maintaining said root and top cutting means a constant distance apart.

10. Celery harvester comprising a frame, ground engaging means, means supporting said frame reciprocably in depth direction from said ground engaging means, longitudinally disposed laterally spaced side wall means carried by said frame at a substantially uniform distance above ground level and extending to such height as to embrace the celery in the zone of its bushy foliage, defining a passage open at the bottom and at both ends for the travel of standing celery therethrough as said harvester is moved over a row of celery, for compacting the bushy foliage portion of the celery, top cutting means carried by said frame at a level above said passage and at an intermediate point in the length of said passage whereby it cuts compacted foliage, root cutting means below said passage positioned rearwardly of said top cutting means, and means carried by said frame for adjustably moving said frame relative to said ground engaging means, thereby moving said root cutting means and top cutting means as a unit in a direction towards or from the ground.

11. Celery harvester comprising a frame, means comprising longitudinally extending spaced side wall members carried by said frame, similarly positioned side by side at a substantial distance above ground level, of such width in a heightwise direction as to embrace the celery in a zone of its bushy foliage, and spaced apart at such distance as to define a passage which compresses the bushy foliage portion as said frame is drawn along a row of standing celery, top cutting means on said frame above said passage located rearwardly of the forward portion thereof for cutting the tops of the compacted foliage portion, and root cutting means located on said frame rearwardly of said top cutting means.

12. Celery harvester comprising a frame, means carried thereby providing rearwardly moving, rearwardly convergent, spaced side walls defining a passage open at the bottom and ends for the longitudinal travel therethrough of standing celery, said walls being spaced from the ground and of such height as to engage the celery in an intermediate zone above the root and below the top whereby the bushy part is progressively compacted as it travels from the wide to the narrow end of said passage, root cutting means carried by said frame working at a level beneath said passage, top cutting means working at a level adjacent the top of said passage, positioned at a point in said passage where the celery is partially compacted, said top cutting means being positioned in advance of said root cutting means whereby the top is severed while the celery is standing, a power shaft on said frame and driving connections on said frame from said power shaft to said side wall means.

13. Celery harvester comprising a frame, means carried thereby providing rearwardly moving, rearwardly convergent, spaced side walls defining a passage open at the bottom and ends for the longitudinal travel therethrough of standing celery, said side walls being spaced from the ground and of such height as to engage the bushy part of the celery in an intermediate zone, above the root and below the top, whereby the bushy part is progressively compacted as it travels from the wide to the narrow end of said passage, root cutting means carried by said frame working at a level beneath said passage, top cutting means working at a level adjacent the top of said passage, positioned at a point in the length of said passage where the celery is partially compacted, said top cutting means being positioned in advance of said root cutting means whereby the top is severed while the celery is standing, said side wall means extending rearwardly of said root cutting means to act as a conveyor for discharging the severed and topped stalks.

14. Celery harvester comprising a frame, belts carried thereby providing rearwardly moving, rearwardly convergent spaced side walls defining a passage open at the bottom and ends for the longitudinal travel therethrough of standing celery, said belts being spaced from the ground and of such height as to engage the bushy part of the celery in an intermediate zone above the root and below the top whereby the bushy part is progressively compacted as it travels from the wide to the narrow end of said passage, root cutting means carried by said frame working at a level beneath said passage, top cutting means working at a level adjacent the plane of the tops of said belts, positioned at a point in the length of said passage where the celery is partially compacted, said top cutting means being positioned in advance of said root cutting means whereby the top is severed while the celery is standing, a power shaft on said frame, and driving connections on said frame from said power shaft to said side wall means, and root cutting and top cutting means, for operating said means.

WILLARD C. SILVA.

REFERENCES CITED

The following references are of record in the file of this patent:

UNITED STATES PATENTS

| Number | Name | Date |
|---|---|---|
| 659,773 | Tucker | Oct. 16, 1900 |
| 968,432 | Stoker | Aug. 23, 1910 |
| 1,442,032 | Luce | Jan. 9, 1923 |
| 1,648,313 | Luce | Nov. 8, 1927 |
| 1,666,818 | Fisher | Apr. 17, 1928 |
| 1,871,026 | Belli | Aug. 9, 1932 |

FOREIGN PATENTS

| Number | Country | Date |
|---|---|---|
| 175 | Great Britain | 1877 |
| 4,845 | Great Britain | 1877 |
| 1,739 | Great Britain | 1879 |
| 23,998 | Great Britain | 1892 |
| 7,107 | Great Britain | 1894 |